(12) United States Patent
Rakhimov

(10) Patent No.: US 6,251,306 B1
(45) Date of Patent: Jun. 26, 2001

(54) INFRARED RADIATION EMITTING CERAMIC MATERIAL

(76) Inventor: Rustam Rakhimov, Ergashev Street, 54, Tashkent, 700084 (UZ)

( * ) Notice: Subject to any disclaimer, the term of this patent is extended or adjusted under 35 U.S.C. 154(b) by 0 days.

(21) Appl. No.: 09/446,501

(22) PCT Filed: May 15, 1998

(86) PCT No.: PCT/IB98/00738

§ 371 Date: Dec. 20, 1999

§ 102(e) Date: Dec. 20, 1999

(87) PCT Pub. No.: WO99/01401

PCT Pub. Date: Jan. 14, 1999

(30) Foreign Application Priority Data

Jun. 30, 1997 (UZ) .................................................. 9700545

(51) Int. Cl.$^7$ ...................................................... H01B 1/06

(52) U.S. Cl. ........................... 252/500; 252/508; 252/509; 501/126; 501/127; 501/128

(58) Field of Search ........................ 250/503.1; 252/500, 252/508, 509; 501/126, 127, 128

(56) References Cited

U.S. PATENT DOCUMENTS 3,585,390 * 6/1971 Ishikawa .

* cited by examiner

*Primary Examiner*—Paul Marcantoni
(74) *Attorney, Agent, or Firm*—Abelman, Frayne & Schwab

(57) ABSTRACT

The present invention relates to ceramic materials that are capable of generating continuous infrared radiation and have enhanced thermal, chemical and physical stability. The object of the invention is to raise the efficiency of emitting IR radiation. The goal is achieved by supplementing the material on the basis of $Cr_2O_3$ and $Fe_2O_3$, with $CaCO_3$.

1 Claim, No Drawings

INFRARED RADIATION EMITTING CERAMIC MATERIAL

The present invention relates to novel ceramic materials that are capable of generating continuous infrared (IR) radiation. More particularly, it relates to refractory ceramic materials that have enhanced thermal, chemical, and physical stability as well as enhanced resistance to thermocycling and that can be used for drying things, for quickly and efficiently sterilizing various objects, for treating cardiovascular disorders, for conveying gases and liquids, for air purification, in cooling systems, in systems where conductivity varies in pulses, in high-temperature heaters, and in lining materials.

Ceramic materials are known of the general formula $RCrO_3$, where R is a rare-earth oxide such as yttrium oxide, described in U.S. Pat. No. 3,475,352. These materials, although successfully used where conductance is essential, e.g. in electrodes, have low chemical stability when exposed to high (over 1600° C.) temperatures, low resistance to thermocycling at temperatures above 1500° C., and cannot be heated at high rates. Furthermore, they have relatively low radiating capacity. These shortcomings have limited the use of these materials in applications where the stability of properties is important.

A device is known for sterilizing a hose coupling for an artificial kidney (see U.S. Pat. No. 4,774,415, Class 250–455.1). The ceramic material of the sterilizer has an insufficient radiating power in the infrared range, which results in insufficient sterilization of some parts of the coupling which do not get the necessary exposure. Increasing the time of sterilization does not help, since it may result in overheating the parts of the coupling most susceptible to TR radiation. In this case articles made of metal and glass may melt, or change colour due to the formation of an oxide film.

A ceramic Composition having more stable thermal, physical and chemical properties is one based on chromium oxide $Cr_2O_3$ (up to 44.7 wt %) and iron oxide $Fe_2O_3$ (up to 35 wt %) and also containing a large amount of silicon oxide $SiO_2$ (10–20 wt %) and $Al_2O_3$, CuO, CaO and MgO as additives (see U.S. Pat. No. 5,350,927, published 27.09.1994, national classification 250–504R, Radiation emitting ceramic materials and devices containing the same), chosen as the prototype. The said ceramic material receives either pulse IR radiation from another ceramic material generating only pulse IR radiation, made in the form of a screen, or radiation from a lamp, a heating coil, and so on, and generates continuous IR radiation used in sterilizers. A shortcoming of the ceramic is the relatively low efficiency of conversion of primary radiation, which severely limits its application in the many fields listed in the preamble.

The object of the present invention is to create a ceramic material that will be capable of uniform IR radiation and have an increased radiating capacity. This goal is achieved by supplementing a ceramic material containing $Cr_2O_3$, $Fe_2O_3$, $SiO_2$, MgO, $Al_2O_3$, CaO, and CuO, with $CaCO_3$, in the following ratio of ingredients, wt %:

| | |
|---|---|
| $Cr_2O_3$ | 28.0 ~ 32.0 |
| $CaCO_3$ | 7.0 ~ 10.0 |
| $Fe_2O_3$ | 33.0 ~ 35.0 |
| $SiO_2$ | 16.0 ~ 17.5 |
| MgO | 4.0 ~ 6.0 |
| CaO | 2.5 ~ 3.0 |
| $Al_2O_3$ | 0.5 ~ 2.0 |
| CuO | 0.5 ~ 1.0 |

It has turned out that it is precisely the addition of $CaCO_3$ in the amount given, with a simultaneous decrease, relative to the prototype, in $Cr_2O_3$, CaO and CuO to the amounts indicated and the amounts of the remaining ingredients held constant, that allows one to obtain a ceramic material capable of generating continuous IR radiation with a radiating power exceeding that of known ceramic materials on the basis of chromium oxide by 23 to 49%.

The ceramic material being claimed is prepared following a conventional route. The ingredients arc milled to a fine powder, mixed until homogeneity is achieved, and placed in the crucible of a solar furnace, where they are melted. The melting is usually done in conditions where the loss of oxygen from the resulting powder is kept to a minimum. As a rule, these ceramic compositions on the basis of chromium oxide are melted at about. 2 600° C. It is desirable that the melting be carried out in an oxidizing atmosphere, preferably in air.

The melt drips into a cooling tank containing water. The resultant material is ground to a grain size of 160 μm and then the powder is pressed into desired articles.

The invention is illustrated in more detail with the following examples of preparing the ceramic material.

EXAMPLE 1

To 1 kg of slag dump from the copper foundry within the Almalik mining and smelting works, containing 274.59 g $SiO_2$, 600.67 g $Fe_2O_3$, 34.32 g $Al_2O_3$, 8.58 g CuO, 51.5 g CaO and 11 g MgO, were added 497.7 g $Cr_2O_3$, 154.5 g $CaCO_3$ and 83.39 g MgO, or, given in wt %:

| | |
|---|---|
| $Cr_2O_3$ | 29.0 |
| $CaCO_3$ | 9.0 |
| $Fe_2O_3$ | 35.0 |
| $SiO_2$ | 16.0 |
| MgO | 5.5 |
| CaO | 3.0 |
| $Al_2O_3$ | 2.0 |
| CuO | 0.5 |

Then the substances were ground in a planetary mill having drums with a plastic lining and tenon balls to a fine powder. The powder was put in the crucible of a solar furnace and melted at 2 600° C. in air. The melt was then dripped into a cooling tank containing water. The ceramic material thus obtained was again milled to a grain size of 160 μm and pressed into desired articles.

In Examples 2 to 4, specimens of the ceramic material were obtained in a similar manner to that in Example 1, only the ratios of ingredients were different. For ease of explanation the compositions of all the examples are listed in Table 1. It should be added that only within the limits of the ratios indicated was it possible to obtain a material with a higher power of emitting IR radiation when heated than that of the prototype.

TABLE 1

| Ingredient, wt % | Example 1 | Example 2 | Example 3 | Example 4 |
|---|---|---|---|---|
| $Cr_2O_3$ | 29.0 | 28.0 | 32.0 | 27.0 |
| $CaCO_3$ | 9.0 | 10.0 | 7.0 | 10.0 |
| $Fe_2O_3$ | 35.0 | 33.0 | 35.0 | 34.0 |
| $SiO_2$ | 16.0 | 17.5 | 17.0 | 17.5 |
| MgO | 5.5 | 6.0 | 4.0 | 6.0 |
| $Al_2O_3$ | 2.0 | 1.5 | 2.0 | 2.0 |
| CaO | 3.0 | 3.0 | 2.5 | 3.0 |
| CuO | 0.5 | 1.0 | 0.5 | 0.5 |

Then the powers of IR radiation emitted by the ceramic material being claimed and the prototype material were measured by the comparison method. For this purpose two planar radiators were used that had the same parameters: 120×24×1.5 mm (an aluminium one) and 120×24×0.8 mm (a copper one). One plate was coated with the prototype material, the other, with the material according to the present invention. Both plates were attached on one side to a small-sized heating element. Each ceramic element was 25×5×1 mm in size and had a resistance of 440 Ohm.

The measurement technique is as follows:

A temperature sensor, together with the heating element, is attached to the centre of the cooling plate using a spring clamp. The heating element is fed with various powers which arc stabilized by the applied voltage. The energized heating element is kept until an equilibrium thermal state is attained at a given environment temperature (natural convection), an indication of which is the constancy in time of the temperature measured by the thermocouple.

Thus, by subtracting the thermometer readings taken on the plate coated with the prototype ceramic from those taken on the plate coated with the ceramic according to the present invention, the difference in temperature is obtained that characterizes the effect of the ceramic only, since the radiating power is in both cases the same.

Two materials were compared that had different thermal conductivities:

an aluminium alloy with a conductivity of 150 W/(m K), and a copper alloy with a conductivity of 350 W/(m K).

The voltage applied to the heating element is alternating, with a frequency of 50Hz.

In all the instances as a prototype was used composition C according to U.S. Pat. No. 5,350,927, with the maximum $Cr_2O_3$ content:

Results of measuring radiating power on the aluminium alloy for the ceramic of Example 1:

TABLE 2

| Voltage, V | Power, W | Temperature $T_1$ of the platecoated with prototype ceramic, °C. | Temperature $T_2$ of the plate coated with the ceramic according to the present invention, °C. | $T_1$-$T_2$, °C. |
|---|---|---|---|---|
| 45 | 4.602 | 78 | 69 | 9 |
| 50 | 5.682 | 87 | 77 | 10 |
| 55 | 5.875 | 97 | 85 | 12 |
| 60 | 8.182 | 104 | 91 | 13 |
| 65 | 9.602 | 113 | 98 | 15 |
| 70 | 11.136 | 121 | 106 | 15 |
| 75 | 12.784 | 129 | 114 | 15 |
| 80 | 14.545 | 137 | 121 | 16 |
| 85 | 16.421 | 146 | 128 | 18 |
| 90 | 18.409 | 152 | 133 | 18 |

Results of measuring radiating power on the aluminium alloy for the ceramic of Example 2:

TABLE 3

| Voltage, V | Power, W | Temperature $T_1$ of the plate coated with prototype ceramic, °C. | Temperature $T_2$ of the plate coated with the ceramic according to the present invention, °C. | $T_1$-$T_2$, °C. |
|---|---|---|---|---|
| 45 | 4.602 | 78 | 70 | 8 |
| 50 | 5.682 | 87 | 79 | 8 |
| 55 | 6.875 | 97 | 87 | 10 |
| 60 | 8.182 | 104 | 94 | 10 |
| 65 | 9.602 | 113 | 101 | 12 |
| 70 | 11.136 | 121 | 108 | 13 |
| 75 | 12.784 | 129 | 116 | 13 |
| 80 | 14.545 | 137 | 124 | 13 |
| 85 | 16.421 | 146 | 131 | 15 |
| 90 | 18.409 | 152 | 137 | 15 |

Results of measuring radiating power on the aluminium alloy for the ceramic of Example 3:

TABLE 4

| Voltage, V | Power, W | Temperature $T_1$ of the plate coated with prototype ceramic, °C. | Temperature $T_2$ of the plate coated with the ceramic according to the present invention, °C. | $T_1$-$T_2$, °C. |
|---|---|---|---|---|
| 45 | 4.602 | 78 | 75 | 3 |
| 50 | 5.682 | 87 | 83 | 4 |
| 55 | 6.875 | 97 | 93 | 4 |
| 60 | 8.182 | 104 | 99 | 5 |
| 65 | 9.602 | 113 | 106 | 7 |
| 70 | 11.136 | 121 | 112 | 9 |
| 75 | 12.784 | 129 | 118 | 11 |
| 80 | 14.545 | 137 | 125 | 12 |
| 85 | 16.421 | 146 | 134 | 12 |
| 90 | 18.409 | 152 | 140 | 12 |

Results of measuring radiating power on the aluminium alloy for the ceramic of Example 4:

TABLE 5

| Voltage, V | Power, W | Temperature $T_1$ of the plate coated with prototype ceramic, °C. | Temperature $T_2$ of the plate coated with the ceramic according to the present invention, °C. | $T_1$-$T_2$, °C. |
|---|---|---|---|---|
| 45 | 4.602 | 78 | 71 | 7 |
| 50 | 5.682 | 87 | 79 | 8 |
| 55 | 6.875 | 97 | 87 | 10 |
| 60 | 8.182 | 104 | 94 | 10 |

TABLE 5-continued

| Voltage, V | Power, W | Temperature $T_1$ of the plate coated with prototype ceramic, °C. | Temperature $T_2$ of the plate coated with the ceramic according to the present invention, °C. | $T_1$-$T_2$, °C. |
|---|---|---|---|---|
| 65 | 9.602 | 113 | 102 | 11 |
| 70 | 11.136 | 121 | 109 | 12 |
| 75 | 12.784 | 129 | 117 | 12 |
| 80 | 14.545 | 137 | 124 | 13 |
| 85 | 16.421 | 146 | 131 | 15 |
| 90 | 18.409 | 152 | 137 | 15 |

It is quite obvious from Tables 2 to 5 that, although fed with the same the plate coated with the ceramic according to the present invention gets heated to a lesser extent owing to the higher efficiency of emitting (dissipating) the radiation received.

The principal unit of power in the radiometric system is Watt. It is the measure of energy emitted per unit time. The difference in the power fed to the heating element, at some fixed temperatures, clearly shows the efficiency of emission of the input power by the ceramic according to the present invention.

TABLE 6

| Temperature, °C. | Power fed to the plate covered with the prototype ceramic, $P_1$, W | Power fed to the plate covered with the ceramic according to the present invention, $P_2$, W | $P_2$-$P_1$ W | $P_2$-$P_1$, % |
|---|---|---|---|---|
| 91 | 6.202 | 8.182 | 1.98 | 30.0 |
| 114 | 9.602 | 12.784 | 3.182 | 24.9 |
| 121 | 11.136 | 14.545 | 3.409 | 23.4 |

Results of measuring radiating power on the copper alloy for the ceramic of Example 1:

TABLE 7

| Voltage, V | Power, W | Temperature $T_1$ of the plate coated with prototype ceramic, °C. | Temperature $T_2$ of the plate coated with the ceramic according to the present invention, °C. | $T_1$-$T_2$, °C. |
|---|---|---|---|---|
| 45 | 4.602 | 81 | 65 | 16 |
| 50 | 5.682 | 90 | 73 | 17 |
| 55 | 6.875 | 99 | 82 | 17 |
| 60 | 8.182 | 107 | 89 | 18 |
| 65 | 9.602 | 116 | 96 | 20 |
| 70 | 11.136 | 125 | 103 | 22 |
| 75 | 12.784 | 134 | 112 | 22 |
| 80 | 14.545 | 143 | 119 | 24 |
| 85 | 16.421 | 150 | 126 | 24 |
| 90 | 18.409 | 159 | 132 | 27 |

Results of measuring radiating power on the copper alloy for the ceramic of Example 2:

TABLE 8

| Voltage, V | Power, W | Temperature $T_1$ of the plate coated with prototype ceramic, °C. | Temperature $T_2$ of the plate coated with the ceramic according to the present invention, °C. | $T_1$-$T_2$, °C. |
|---|---|---|---|---|
| 45 | 4.602 | 81 | 68 | 13 |
| 50 | 5.682 | 90 | 76 | 14 |
| 55 | 6.875 | 99 | 85 | 14 |
| 60 | 8.182 | 107 | 92 | 15 |
| 65 | 9.602 | 116 | 100 | 16 |
| 70 | 11.136 | 125 | 106 | 19 |
| 75 | 12.784 | 134 | 114 | 20 |
| 80 | 14.545 | 143 | 122 | 21 |
| 85 | 16.421 | 150 | 128 | 22 |
| 90 | 18.409 | 159 | 135 | 24 |

Results of measuring radiating power on the copper alloy for the ceramic of Example 3:

TABLE 9

| Voltage, V | Power, W | Temperature $T_1$ of the plate coated with prototype ceramic, °C. | Temperature $T_2$ of the plate coated with the ceramic according to the present invention, °C. | $T_1$-$T_2$, °C. |
|---|---|---|---|---|
| 45 | 4.602 | 81 | 72 | 9 |
| 50 | 5.682 | 90 | 80 | 10 |
| 55 | 6.875 | 99 | 89 | 10 |
| 60 | 8.182 | 107 | 96 | 11 |
| 65 | 9.602 | 116 | 104 | 12 |
| 70 | 11.136 | 125 | 113 | 12 |
| 75 | 12.784 | 134 | 119 | 15 |
| 80 | 14.545 | 143 | 128 | 15 |
| 85 | 16.421 | 150 | 133 | 17 |
| 90 | 18.409 | 159 | 141 | 18 |

Results of measuring radiating power on the copper alloy for the ceramic of Example 4:

TABLE 10

| Voltage, V | Power, W | Temperature $T_1$ of the plate coated with prototype ceramic, °C. | Temperature $T_2$ of the plate coated with the ceramic according to the present invention, °C. | $T_1$-$T_2$, °C. |
|---|---|---|---|---|
| 45 | 4.602 | 81 | 70 | 11 |
| 50 | 5.682 | 90 | 78 | 12 |
| 55 | 6.875 | 99 | 86 | 13 |
| 60 | 8.182 | 107 | 94 | 13 |
| 65 | 9.602 | 116 | 102 | 14 |
| 70 | 11.136 | 125 | 109 | 16 |
| 75 | 12.784 | 134 | 117 | 17 |
| 80 | 14.545 | 143 | 126 | 17 |
| 85 | 16.421 | 150 | 131 | 19 |
| 90 | 18.409 | 159 | 137 | 22 |

It can be seen from Tables 7 to 10 that, with the copper alloy, the coating of the ceramic being claimed is even more efficient in emitting the power received, which, in turn, results in a greater difference in the temperatures to which copper plates coated with the ceramics are heated when emitting the same power.

Some examples of comparing the emitted powers expressed in percentages reveal an even more striking difference in the efficiency of power emission by the ceramic according to the present invention and the prototype ceramic.

TABLE 11

| Heating temperature, °C. | Power fed to the plate covered with the prototype ceramic, $P_1$, W | Power fed to the plate covered with the ceramic according to the present invention, $P_2$, W | $P_2-P_1$, W | $P_2-P_1$, % |
|---|---|---|---|---|
| 81 | 4.602 | 6.875 | 2.273 | 49.0 |
| 90 | 5.682 | 8.182 | 2.500 | 44.0 |
| 125 | 11.136 | 16.421 | 5.285 | 47.5 |

The data given clearly show an increase in the efficiency of emitting IR radiation by the novel ceramic material of up to 50% as compared with the prototype material. It can also be seen that Example 1 gives the optimum composition that ensures the highest efficiency of emitting IR radiation. The other compositions also contribute to increasing the power of IR radiation, but to a lesser extent. Going outside the range of the claimed ingredient percentages of the novel ceramic material in either direction results in there being no such effect or its being so small as to be of no practical importance.

Notwithstanding that only four examples are given illustrating the percentage composition of the novel ceramic material, so as not to clutter the description with dozens of tables, the scope of the invention covers all the combinations of the ingredients falling within the given percentage ratios.

What is claimed is:

1. An infrared ceramic material comprising $Cr_2O_3$, $Fe_2O_3$, $SiO_2$, MgO, $Al_2O_3$, CaO, and CuO, whose distinguishing property is that it also contains $CaCO_3$, in the following ratios of ingredients, in wt %:

| | |
|---|---|
| $Cr_2O_3$ | 28.0~32.0 |
| $CaCO_3$ | 7.0~10.0 |
| $Fe_2O_3$ | 33.0~35.0 |
| $SiO_2$ | 16.0~17.5 |
| MgO | 4.0–6.0 |
| CaO | 2.5~3.0 |
| $Al_2O_3$ | 1.5~2.0 |
| CuO | 0.5~1.0. |

* * * * *